Jan. 13, 1959
P. M. MINDER
2,869,070
ARRANGEMENT FOR VARYING KILOVAR OUTPUT
OF CAPACITOR BANK IN STEPS
Filed Nov. 10, 1955
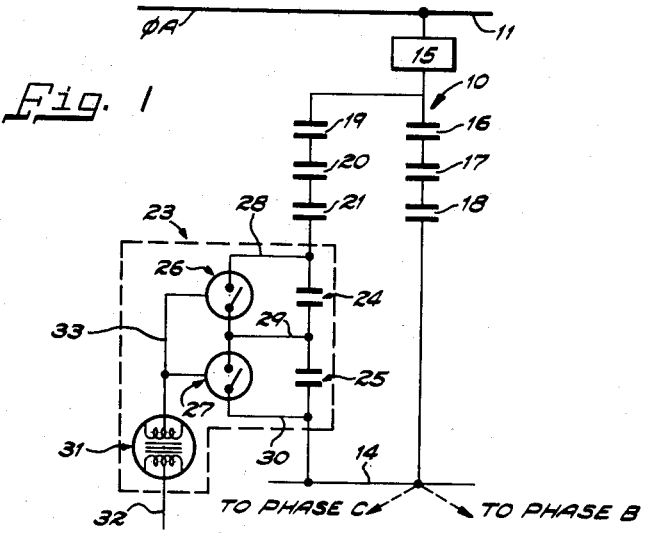
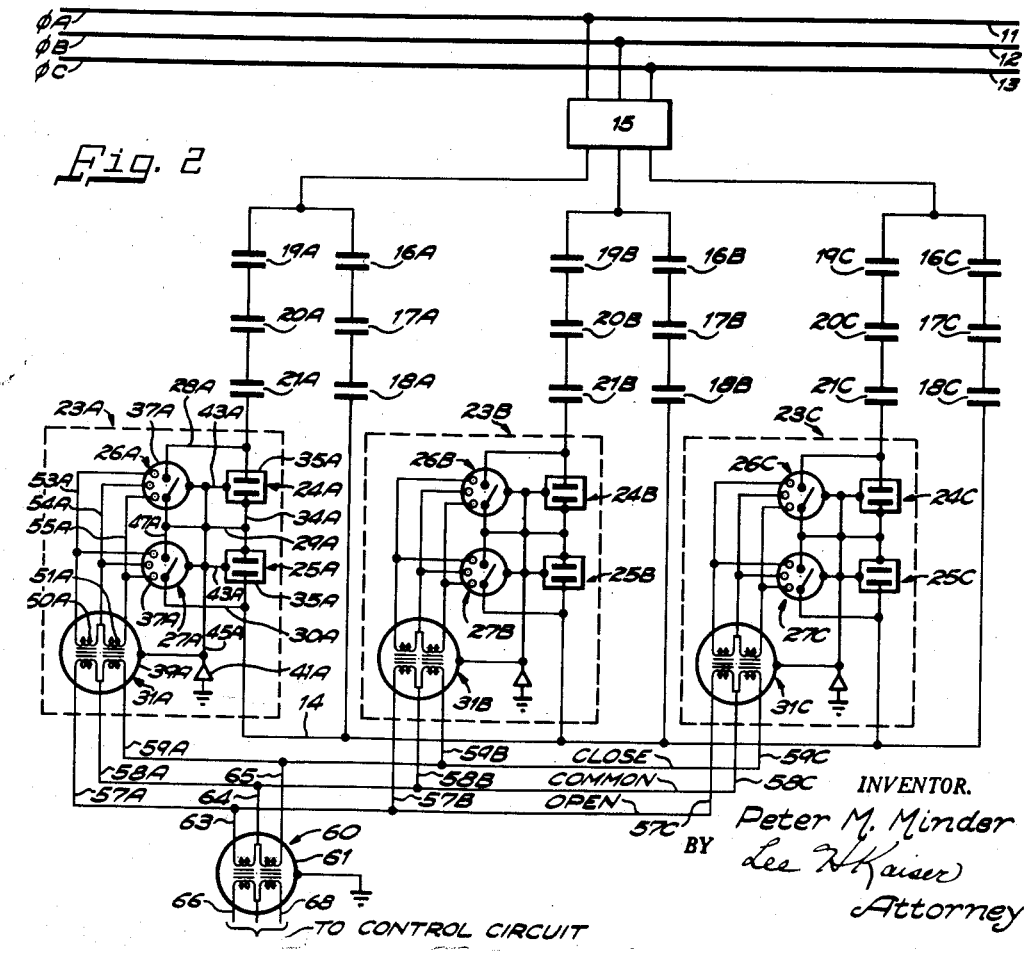
INVENTOR.
Peter M. Minder
BY Lee H. Kaiser
Attorney United States Patent Office 2,869,070
Patented Jan. 13, 1959

2,869,070

ARRANGEMENT FOR VARYING KILOVAR OUTPUT OF CAPACITOR BANK IN STEPS

Peter M. Minder, Basel, Switzerland, assignor to McGraw-Edison Company, a corporation of Delaware Application November 10, 1955, Serial No. 546,132

16 Claims. (Cl. 323—122)

This invention relates to alternating current transmission and distribution lines and more particularly to shunt capacitor banks for supplying reactive power to such lines.

Capacitors are frequently connected in shunt to alternating current transmisison and distribution lines to relieve the system of the need of carrying at least part of the reactive requirements of the load, i. e., to relieve the line and source equipment of wattless current. Because of variation in load demand, it has not been found advisable to use unswitched shunt capacitors for the compensation of all the load kilovar requirements. It is more economical to apply part of the power factor correction in the form of controlled shunt capacitors. Generally, the kilovars of capacitance required to achieve a power factor near unity at peak system loads are greater than are needed at the minimum system load, and if permanently connected would creat a leading power factor at light load. In order to prevent this condition, it is necessary to provide means for disconnecting the capacitors from the system at light loads. When a relatively large amount of capacitance is required, the usual arrangement is to utilize the necessary number of capacitors of standard kva. and voltage rating connected together in a suitable series-parallel arrangement.

In large, high voltage capacitor banks, the capacitors are usually connected in groups, each group consisting of a number of capacitors connected in parallel, and a number of such groups are connected in series from phase to phase, or from phase to neutral, of the transmission or distribution system. The phase to phase, or phase to neutral, voltage determines the number of series groups. For many years transformers were used to step down the voltage to the range of the capacitor ratings. This was superseded a few years ago by the practice of connecting low voltage capacitors in series-parallel groups and directly to the high voltage line which was found more economical than the use of high voltage capacitors or the use of transformers and low voltage capacitors.

Although a capacitor bank can be switched in one step, it is general practice to provide switching so that a large bank is connected to the system as needed in several equal steps. Changes in operating conditions of the circuit usually requires variations in the amount of connected capacitive reactance, and it is therefore common practice to divide the total capacitive reactance of a bank into a plurality of steps, usually of equal size, each of which is provided with its own circuit breaker. The circuit breaker switches at full phase to phase, or phase to neutral, voltage and, in addition, must be capable of handling short circuit currents. Restriking phenomena and the attendant voltage surges are encouraged when switching capacitive currents involved in de-energizing capacitor banks. When a large capacitor bank is de-energized, larger than normal system voltages may exist across the circuit breaker contacts because of the trapped charge on the capacitors and thus impose a greater than normal task on the circuit breaker dielectric. If restriking occurs, there may be voltage stresses above normal on the capacitors. Consequently, elimination of restrikes is one of the principal objectives in capacitor switching. Restrike free performance is difficult to obtain when circuit breakers insulated for full line voltage are utilized to switch each step of capacitors, primarily because the inertia of the comparatively massive parts of breaker prevents fast operation of the breaker contacts.

It is an object of the invention to provide a new and improved circuit arrangement for the switching of shunt capacitors.

It is a further object of the invention to obviate the necessity of an expensive circuit breaker for each step in the switching of a shunt capacitor bank.

Another object of the invention is to provide means in a shunt capacitor bank for connecting capacitors to the power system at voltages which are only a fraction of the phase-to-phase, or phase-to-neutral, voltage of the system. A further object of the invention is to provide such switching means which is substantially free from restrikes.

Another object of the invention is to provide an improved arrangement for the switching of shunt capacitors at potentials that are only a fraction of line voltage wherein inrush currents are not of sufficient severity to require current limiting reactors upon connection of the capacitors and no significant transients are generated to stress the insulation of the switching means upon disconnection of the capacitors.

A still further object of the invention is to provide such an improved capacitor switching arrangement permitting switching at potentials below full line voltage wherein the steps of a capacitor bank are physically independent and no tie-lines are required between the capacitors of the different steps.

Still another object of the invention is to provide such an improved capacitor switching arrangement for a polyphase power system wherein all of the apparatus required for the switching of a step of a capacitor bank can be incorporated into a compact unit, permitting factory assembly of the unit and shipment thereof ready for installation in a power system.

The principle of the invention involves the connection of an impedance in series with the capacitors of each step except the first of such a high value that the reactive volt ampere output of the step is only a minor fraction of the rated kilovar output and the provision of switching means to short circuit the impedance when it is desired to increase the kilovars supplied to the power system. Preferably the first step of the capacitor bank is switched in conventional manner by a circuit breaker. The capacitors of each additional step are conventional in number and mounting. When the switching means of an additional step closes and short circuits the impedance in series with the capacitors of the step, rated kilovars are supplied to the system. When the switching means is open, the impedance is so high that the total kilovars of the step are only an insignificant percentage of the total step kilovars. In other words, each additional step of capacitors is not normally disconnected from the power system but instead is in effect inactivated by the large impedance in series with it. In a polyphase system an impedance is provided in each phase of each step except the first, and to switch an additional step of capacitors to the power system, means are provided to operate the corresponding short circuiting switches of all the phases substantially simultaneously.

Other objects and advantages of the invention will be apparent from the following description of the invention taken in connection with the accompanying drawing wherein:

Fig. 1 is a circuit diagram schematically illustrating the principle of the invention for switching a capacitor bank in shunt to a power system in a plurality of steps, only a single phase being shown; and Fig. 2 is a circuit diagram of a preferred embodiment of the invention for connecting a capacitor bank in a plurality of steps to a polyphase power system.

Referring to the drawing, Fig. 1 schematically illustrates a capacitor bank adapted to be connected in shunt across conductors 11 and 14, which may be the line conductors of a single phase or a polyphase transmission or distribution line or may be a phase conductor and neutral of a polyphase power system. The invention will be described with reference to a polyphase power system wherein the capacitor bank is made up of a plurality of phase groups 10, only one of which is shown in Fig. 1, connected in Y at a common point to define neutral 14. However, the invention is also applicable to a delta connected capacitor bank. To provide smooth power factor control, it is desirable to divide the capacitor bank, and thus the phase groups 10, into steps of equal capacitive reactance, two such steps being illustrated in Fig. 1, and the term "step" is intended to connote the capacitors of a bank which are switched at one time onto the power system. Each step of phase group 10 is illustrated as comprising three capacitors in electrical series and adapted to be connected across phase connector 11 and neutral conductor 14 by a circuit breaker 15. Although the invention comprehends a capacitor bank having only a single capacitor between conductors 11 and 14, it is uneconomical to provide high voltage capacitors which will withstand the full line voltage at which distribution and transmission power circuits are conventionally operated, and low voltage capacitors are conventionally connected in series across the power line, three such capacitors 16, 17 and 18 being connected in series in step one of phase group 10 and three capacitors 19, 20 and 21 connected in series being included in step two of phase group 10. It will be understood that although each of the capacitors 16–21 may be a single capacitor unit, in a conventional capacitor bank a relatively large number of capacitor units will usually be connected in parallel to provide the desired capacitive reactance and current capacity. The term "capacitor" as used hereinafter in the description and the appended claims is to be understood, therefore, as referring to a group of individual capacitor units connected in parallel as well as to a single unit.

The circuit breaker 15 for switching capacitors at full line voltage must be capable of handling short circuit currents and is subject to restrikes and cumulative voltage buildup. In order to interrupt the current to the capacitors 16–21 with a minimum of restriking, the circuit breaker 15 is preferably of the oil-filled type. Prior art installations in which an oil circuit breaker insulated for full line voltage was provided for each step of the bank were unnecessarily expensive, and, in the illustrated embodiment of the invention only a single circuit breaker 15 is required for the switching of all of the steps of the capacitor bank.

In my copending application Serial No. 603,343, and having the same assignee as the present invention, a system for switching capacitor banks having serially connected groups of paralleled capacitors is disclosed which obviates the need of a circuit breaker for connecting the capacitor bank to the power system. In the system therein disclosed, the first step of the bank is permanently connected in shunt to the power system and the capacitors of the additional steps are connected in parallel with the individual capacitors, or with the individual groups, of the first step at voltages which are only a fraction of the line voltage. The present invention also comprehends the permanent connection of the first step of the capacitor bank in shunt to the power system, and in such alternative embodiment the necessity for the oil circuit breaker 15 is obviated.

Closing of circuit breaker 15 connects the first step of capacitors including the serial arrangement of capacitors 16, 17 and 18 across phase conductor 11 and neutral conductor 14. For each additional step after the first a "neutral switching unit" is provided in each phase to connect the capacitors of that step in shunt to the electrical power system. Neutral switching unit 23 for connecting the second step of phase group 10 between phase conductor 11 and neutral 14 comprises the elements schematically shown within the dotted line rectangle and includes "neutral impedances" 24 and 25 connected in series with capacitors 19, 20 and 21 of the second step. The serial arrangement of capacitors 19, 20 and 21 and "neutral impedances" 24 and 25 is connected across the phase conductor 11 and neutral conductor 14 upon operation of oil circuit breaker 15. The electrical impedance of "neutral impedances" 24 and 25 is so high that normally the number of kilovars supplied to the system by capacitors 19, 20 and 21 is an insignificant part of their total rated kilovars. The impedances 24 and 25 can be inductances or resistances or may conveniently take the form of capacitive reactances as illustrated in Fig. 1. The values of typical impedances 24 and 25 are discussed hereinafter in connection with the description of Fig. 2.

In a typical capacitor bank each capacitor 19, 20 and 21 comprises a plurality of capacitor units in parallel, and it will be appreciated that the impedance of such a group of paralleled capacitor units is so low in comparison to that of a "neutral impedance" 24 or 25 in the form of a single capacitor that there is little voltage drop across the paralleled capacitors and that consequently the number of kilovars added to the system by the capacitors 19, 20 and 21 is not appreciable.

The neutral switching unit 23 includes switching means to short circuit the impedances 24 and 25 and thus "switch" the capacitors 19, 20 and 21 of step two of phase group 10 to the power system. The switching unit 23 includes an electrical switch 26 connected in parallel with impedance 24 by conductors 28 and 29 and adapted when closed to short circuit impedance 24 and also includes an electrical switch 27 connected in parallel with impedance 25 by conductors 29 and 30 and adapted when closed to short circuit impedance 25. When impedances 24 and 25 are short circuited, the serial arrangement of capacitors 19, 20 and 21 of the second step is connected directly across phase conductor 11 and neutral 14 to switch the total kilovars of the second step to the power system. Thus, although the capacitors 19, 20 and 21 are connected to the system as soon as circuit breaker 15 operates, they are, in effect, inactivated because of the high impedance of the neutral impedances 24 and 25, and when the impedances 24 and 25 are short circuited, full phase to neutral voltage appears across the serially connected capacitors 19, 20 and 21 and rated kilovars are supplied to the power system.

It will be appreciated that the invention comprehends a single neutral impedance in series with the capacitors 19, 20 and 21 as well as the illustrated embodiment wherein a plurality of impedances are connected in series with the capacitors of each additional step. When the switches 26 and 27 are open, a large percentage of the phase to neutral voltage appears across the impedances 24 and 25. If only a single neutral impedance is utilized, it must be insulated to withstand much higher voltages than if a plurality of such impedances are connected in series and only a fraction of the line to neutral voltage appears across each impedance.

The switches 26 and 27 are preferably of the type having latch trip, or snap action, contacts (not shown) immersed in a liquid dielectric. Although the switches may be of the type which can be actuated mechanically through an operating handle, they are preferably of the type which can also be actuated electrically through a remote control operating coil. A switch suitable for the purposes of the invention is shown in U. S. Patent 2,671,141 to William J. Weinfurt having the same assignee as the prevent invention.

It will be appreciated that because of the high voltages that appear across impedances 24 and 25 when the switches 26 and 27 are open, abnormally high voltage stress may result between the contacts of the switches 26 and 27 and the remote control operating mechanism (not shown) therefor if the mechanism, which operates on 110 volts, is maintained at ground potential or at the potential of the neutral 14. The control circuit of the operating mechanism (not shown) of the switches 26 and 27 is raised to the insulation level of the impedances 24 and 25 by a 1-to-1 ratio isolating transformer 31 having high insulation breakdown strength.

The same control signal is utilized to energize the remote control operating mechanism (not shown) of both switches 26 and 27. When the switches 26 and 27 are of the preferred type disclosed in the aforementioned U. S. Patent 2,671,141 to W. J. Weinfurt, three wire control of the switches is conventionally utilized and the insulating transformer 31 has two 1-to-1 ratio core and coil assemblies (see Fig. 2) in a single casing 39. In order to simplify the drawing, the three control wires leading to each switch 26 and 27 are omitted from Fig. 1 and only a single control lead 32 to the insulating transformer 31 is shown and only a single control lead 33 is illustrated from the transformer 31 to the switches 26 and 27 in multiple.

Fig. 2 is a schematic circuit diagram of a typical installation for a multi-step capacitor bank adapted to be connected to a polyphase power system with only a single circuit breaker having insulation of the line voltage rating. The invention also comprehends permanently connecting the first step of the capacitor bank to eliminate the circuit breaker, if desired, in accordance with my aforementioned application Serial No. 603,343. The conductors 11, 12 and 13 may be the line conductors of phase A, phase B, and phase C, respectively of a 34.5 kilovolt three phase alternating current system. In Fig. 2 only two steps of the capacitor bank are illustrated. The capacitors to be connected in two equal steps to phase A comprise the ⅓ of the bank on the left of Fig. 2, the capacitors to be connected to phase B comprise the middle ⅓ of the bank, and the capacitors to be connected to phase C comprise the ⅓ to the right of the diagram.

In each phase of the capacitor bank, three serially connected groups each preferably composed of twenty-two paralleled capacitor units are connected between the corresponding line conductors 11, 12 and 13 and the neutral 14 in each step of the bank. The illustration of all 66 capacitor units of each step of each phase would unnecessarily complicate the drawing, and only one capacitor of each serially connected group of 22 paralleled capacitor units is illustrated. Thus, the capacitor symbol 16A represents 22 capacitors of 25 kva. rating in parallel of a total of 550 kilovars.

The first step of all three phases of the capacitor bank is switched by circuit breaker 15 at full phase to neutral voltage, i. e., at $34.5/\sqrt{3}$ equals approximately 19.9 kilovolts. Throughout the description identical parts in the three phases are given identical reference numerals and the letters A, B and C indicate that the part is in phase A, phase B, or phase C, respectively. Thus, operation of circuit breaker 15 to switch step one of the capacitor bank connects the serial arrangement of capacitors 16A, 17A and 18A of phase A between neutral 14 and phase conductor 11, connects the serial arrangement of capacitors 16B, 17B and 18B in phase B between neutral 14 and phase conductor 12 and also connects the serial arrangement of capacitors 16C, 17C and 18C of phase C between neutral 14 and phase conductor 13. Inasmuch as each capacitor unit 16–18 is preferably of 25 kva. rating, approximately 66 times 25 equals 1650 kilovars are connected to the power system in each phase of step one, and in each step of the capacitor bank a total of 3 times 1650 equals 4950 kilovars is connected to the system.

A neutral switching unit 23 is included in each additional step of each phase for switching the corresponding step of capacitors to the power system. The neutral switching unit 23 in step two of each phase includes two impedances 24 and 25, two electrical switches 26 and 27 for short circuiting the neutral impedances 24 and 25, and an insulating transformer 31. Operation of circuit breaker 15 connects the serial arrangement of capacitors 19, 20 and 21 of each phase of step two in series with the impedances 24 and 25 of the respective phase between neutral 14 and the corresponding phase conductor. The electrical impedance of the "neutral impedances" 24 and 25 is so high in comparison to that of the paralleled capacitor units represented by each of the reference characters 19, 20 and 21 that only an insignificant number of kilovars is added to the system before the switches 26 and 27 are closed to short circuit the impedances 24 and 25. For example, in phase A, the impedance of 22 paralleled capacitor units represented by each of the symbols 19A, 20A and 21A, is only approximately 81 ohms, whereas the electrical impedance of each of the capacitive reactances 24A and 25A, which are preferably of 15 kva. rating, is approximately 10,400 ohms. As a consequence of the high electrical impedance of the "neutral impedances" 24A and 25A, the phase to neutral voltage drop is almost entirely across the impedances 24A and 25A and the number of kilovars added to the system by the capacitors 19A, 20A and 21A is only approximately 1.15% of the total kilovar of step two of phase A. When the impedances 24A and 25A are short circuited by closing the electrical switches 26A and 27A respectively, the entire voltage between phase conductor 11 and neutral 14 is connected across the serial arrangement of capacitors 19A, 20A and 21A, and the entire 1650 kilovars of step two of phase A is switched on the power system.

The neutral switching units 23B and 23C of phases B and C respectively are identical to unit 23A of phase A. The switching of the capacitors 19, 20 and 21 of step two of phases B and C is accomplished in a manner identical to that of phase A, and control signals are provided to operate the remote control operating mechanisms of the switches 26 and 27 of all three phases substantially simultaneously. As mentioned hereinbefore the switches 26 and 27 are preferably of the type disclosed in U. S. Patent 2,671,141 to Weinfurt which may be either mechanically actuated through an operating handle or remotely controlled electrically through an operating mechanism. Remote electrical control of such switches is conventionally accomplished over three wires as disclosed hereinafter, and the mechanisms for operating switches 26 and 27 in response to control signals over such wires has been omitted from the drawing, reference being had to the patent for details of construction. Further, a copending application of Henry H. Strozier, Serial No. 402,296, having the same assignee as the present invention, discloses both means to accomplish mechanical operation of electrical switches in all three phases of a capacitor bank substantially simultaneously and an electrical circuit for accomplishing substantially simultaneous electrical actuation of switches in all the phases of a polyphase capacitor bank.

Almost full phase to neutral voltage is impressed across the impedances 24A and 25A when the switches 26A and 27A are open. If only a single neutral impedance is utilized in series with the capacitors 19A, 20A and 21A, the insulation to the casing of such impedance would be subjected to a voltage of approximately $34.5/\sqrt{3}$ equals approximately 20 kilovolts. In order to reduce the insulation required, two neutral impedances 24A and 25A are connected in series by a conductor 34A, and further the casings of all the elements of neutral switching unit 23A and certain of the electrical leads interconnecting these elements are electrically commoned and insulated from ground. As illustrated in Fig. 2 the casings 35A of the impedances 24A and 25A, the casings 37A of switches 26A and 27A, and the casing 39A of the insulating transformer 31A are all electrically commoned and insulated from ground by an insulator 41A preferably of the 23 kilovolt class. The conductor 34A connecting the impedances 24A and 25A in series is also electrically connected to the casings 35A of both impedances 24A and 25A. Conductors 43A electrically common the casing 37A of switches 26A and 27A with the casings 35A of impedances 24A and 25A. A wire 45A electrically connected to the casing 39A of isolating transformer 31A is also connected to both conductors 43A, and the conductor 29A electrically commons the lead 34A, the lead 45A, and the lead 47A connecting the contacts of the two switches 26A and 27A. In this manner the casings 35A of impedances 24A and 25A, the casing 37A of switches 26A and 27A, the casing 39A of isolating transformer 31A as well as one high voltage terminal of each of the switches 26A and 27A and one high voltage terminal of each of the impedances 24A and 25A are at the same electrical potential and insulated from ground by an insulator 41A of the 23 kilovolt class, permitting all five elements 24A, 25A, 26A, 27A and 31A of switching unit 23A to be mounted on the same frame.

This arrangement permits lowering of the insulation levels of the equipment. The normal voltage drop across each of the impedances 24A and 25A when switches 26A and 27A are open is only approximately 10 kilovolts. With the casings of the switches and impedances commoned and insulated from ground, the insulation from the contacts of the switches 26 and 27 to the casings thereof and from the capacitor packs of the impedances 24 and 25 to the casing thereof is lowered considerably in comparison to conventional installations.

This arrangement also permits the use in switching unit 23A of an isolating transformer 31A of the 15 kilovolt insulation class which is considerably less than the insulation that would be required if a single insulating transformer having a grounded casing were utilized to raise the control signal to the voltage level of the impedance 24A. The insulating transformer 31A includes two separate 1-to-1 ratio core and coil assemblies 50A and 51A. The primary windings of the core and coil assemblies 50A and 51A are connected together internally of the casing 39A to form a common terminal, thus requiring only three high voltage bushings (not shown) for the transformer 31A. Similarly one end of the secondary winding of core and coil assemly 50A is connected to one end of the secondary winding of core and coil assembly 51A to form a common terminal, thus necessitating only three secondary bushings (not shown) for the transformer 31A. Electrical conductors 53A, 54A and 55A from the three high voltage bushings (not shown) of insulating transformer 31A are connected respectively to the Open, Common, and Close terminals of both switches 26A and 27A, thereby providing substantially simultaneous opening and closing of these switches when control signals are provided over leads 53A and 55A respectively.

The Open, Common, and Close conductors 57, 58 and 59 from all of the switching units 23 are paralleled and connected by conductors 63, 64 and 65 respectively to the high voltage bushings (not shown) of an insulating transformer 60, preferably similar to the insulating transformer 31 and of the 15 kilovolt insulation class, having the casing 61 thereof grounded. Signals for actuating switches 26 and 27 provided from a control circuit (not shown) over Open control conductor 66 and Close control conductor 68 are stepped up to a higher voltage level by insulating transformer 60 and transmitted over leads 57 and 59 through insulating transformers 31 to the remote control operating mechanisms (not shown) of the switches 26 and 27 in all three phases to effect substantially simultaneous operation of the short circuiting switches 26 and 27 in all of the phases and thus switch the second step of the capacitor bank between the phase conductors 11, 12 and 13 and neutral 14. This arrangement permits the means for supplying the control signals to be at ground potential, and the insulating transformers 31 and 60 elevate the 110 volt control signal to the voltage level of the switches 26 and 27. Although the insulator 41A is of the 23 kilovolt class, and thus of a higher insulation level than the transformer 31 which is insulated for only 15 kilovolts, the insulating transformers 31 and 60 are in cascade and the insulation of transformer 60 adds to the insulation level of transformer 31 to raise the control signal to the voltage level of switches 26 and 27.

The disclosed capacitor switching arrangement obviates the necessity of an expensive oil circuit breaker for each step of a multi-step capacitor bank. The kilovars supplied to the system by capacitors 19, 20 and 21 of step two are varied by operation of the comparatively inexpensive switches 26 and 27 which switch at voltages that are only a fraction of the line voltage. Further no tie wires are required between the capacitors of the different steps. It will be appreciated that the capacitor bank per se is of conventional construction and that all of the elements of the neutral switching unit 23 of each step of each phase may be assembled in the factory as a compact unit and shipped ready for installation.

Inrush currents upon closure of short circuiting switches 26 and 27 are not of sufficient severity in most installations to require current limiting reactors. Inasmuch as the first step of the capacitor bank is always connected in parallel with an additional step when such additional step is disconnected from the power system, no significant transients are created upon opening of the short circuiting switches 26 and 27. Further the snap action of the contacts of the switches 26 and 27 substantially eliminates restrikes in the disconnection of the capacitors.

It will be noted that the switching of all the additional steps is at the neutral side of the series groups of capacitors. This arrangement permits the insulation level of the switching means to be considerably lower than in an installation where the switching is at the phase conductor side. In addition, when the switching is at the neutral side, the impedance of the capacitors limits the maximum fault current which must be carried by the switching means.

While I have shown and described preferred embodiments of the invention, it will be apparent to those skilled in the art that changes and modifications can be made without departing from the invention, and I intend in the appended claims to cover all such modifications and variations as fall within the true spirit and scope of the invention.

What I claim as new and desire to secure by Letters Patent of the United States is:

1. In combination with a polyphase alternating current electrical power system, a capacitor bank having a plurality of phase groups each comprising a plurality of parallel branches of serially arranged capacitors adapted to be connected to one of the phase conductors of said polyphase system and in shunt to said system, one of the branches in each of the phase groups including an impedance element in series with the capacitors of said one of said branches, the capacitors of said one branch being normally energized in series with said element and the electrical impedance of said element being sufficiently greater than the combined impedance of the capacitors in series therewith that said capacitors of said one branch normally supply only a relatively small magnitude of leading current to said power system, each said one branch also including a short circuiting switch connected in parallel with said element and adapted upon closure to short circuit said element and upon opening to remove the short circuit, and means for operating said electrical switches in all of the phase groups substantially simultaneously whereby the leading current supplied by the capacitors of said one branch is increased in all of said phase groups.

2. In a capacitor bank in accordance with claim 1 wherein each element has a metal casing, each switch has a metal casing and is adapted upon the receipt of a first electrical control signal to close and short circuit the element associated therewith and upon the receipt of a second electrical control signal to open and remove the short circuit, said means for operating said switches includes a plurality of metal-encased isolating transformers for coupling electrical control signals to said switches, one transformer being associated with each said one of the branches, the casings of said element, said switch, and said transformer of each said one of the branches being electrically commoned and insulated from ground.

3. In combination with a polyphase alternating current electrical power system, a capacitor bank comprising a plurality of phase groups equal in number to the phases of said system, each phase group having a plurality of parallel branches each of which includes a plurality of serially connected capacitors, switching means for substantially simultaneously connecting the branches of all of the phase groups in shunt to said power system, at least one of said branches in each phase group including an impedance element in series with the capacitors thereof, the capacitors of said one branch being normally energized in series with said element and the electrical impedance of said element being sufficiently greater than the total electrical impedance of the capacitors in series therewith that only a relatively small magnitude of reactive volt amperes is normally supplied to said power system by the capacitors of said one branch, and means to vary the reactive volt amperes supplied by the capacitors of said one branch to said power system between said small magnitude and a relatively larger magnitude including an electrical switch having a pair of normally open contacts in shunt with said element operable between open and closed positions and adapted upon closure to short circuit said element and upon opening to remove the short circuit, and means for actuating said electrical switches of all of the phase groups substantially simultaneously.

4. In combination, a polyphase alternating current electrical power system, a capacitor bank for supplying reactive volt amperes to said system comprising a plurality of phase groups equal in number to the phases of said system, each phase group including at least two parallel branches of serially connected capacitors, means for connecting the branches of all of the phase groups in shunt to said system, said capacitor bank being adapted to vary the reactive volt amperes supplied to said system in a plurality of steps each of which includes a plurality of said branches, one being in each phase group, each step after the first including in each branch thereof an impedance element in series with the capacitors of said branch and an electrical short circuiting switch in parallel with said element, the capacitors in each branch of each step after the first being normally energized in series with said element and the impedance of each said element being sufficiently greater than the total impedance of the capacitors in series therewith that they normally supply only a relatively small magnitude of reactive volt amperes to said power system, each step after the first also including means for operating said electrical switches thereof substantially simultaneously, whereby the reactive volt amperes supplied by the capacitors of said step to said power system may be varied between said small magnitude and a relatively greater magnitude.

5. In combination with an alternating current electrical power line, a capacitor bank having a plurality of parallel branches each of which includes a plurality of serially connected capacitors, at least one of said branches including a plurality of electrical impedance elements in series with the capacitors thereof and also including a plurality of electrical switches each of which is in parallel with one of said electrical elements and adapted upon closure to short circuit said one of said elements and upon opening to remove the short circuit, the impedance of each of said elements being greater than the total impedance of said capacitors in series therewith, each of said capacitors, said elements, and said switches being insulated to safely withstand a maximum voltage which is less than the voltage of said power line, said one branch being normally connected in shunt to said power line and the capacitors of said one branch normally supplying a relatively small magnitude of reactive volt amperes to said power line and being adapted upon closure of one of said electrical switches to supply a relatively greater magnitude of reactive volt amperes to said power line.

6. In combination with a polyphase alternating current electrical power system, a multi-step capacitor bank connected in star to said power system and having a plurality of phase groups each having a plurality of parallel branches of serially arranged capacitors connected to the neutral of said bank, switching means for substantially simultaneously connecting the branches of each of said phase groups to one of the phase conductors of said system and in shunt to said system, one of the branches in each of the phase groups including an electrical impedance element in series with the serially arranged capacitors thereof, the capacitors of said one branch being normally energized in series with said element and the electrical impedance of said element being sufficiently greater than the total impedance of the capacitors in series therewith that only a relatively small magnitude of reactive volt amperes is normally supplied by the capacitors of said one branch to said power system, means for varying the reactive volt amperes supplied by said capacitors of said one branch to said power system between said small magnitude and a relatively larger magnitude including an electrical short circuiting switch connected in parallel with said element and adapted upon closure to short circuit said element and upon opening to remove the short circuit, and means for operating said electrical switches in all of the phase groups substantially simultaneously.

7. In combination, a polyphase alternating current electrical power system, a star connected capacitor bank adapted to supply reactive volt amperes to said system comprising a plurality of phase groups each of which includes the capacitors associated with one of the phases of said system, the capacitors of each phase group being arranged in a plurality of parallel branches each of which includes a plurality of serially connected capacitors, means for connecting all of the branches of each phase group between the neutral of said bank and the corresponding phase conductor, said bank being adapted to vary the reactive volt amperes supplied to said system in a plurality of steps each of which includes a plurality of said branches, one being in each phase group, each step after the first including a plurality of impedance elements, one being in each phase group in electrical series with the capacitors of said one branch, the capacitors of each said one branch being normally energized in series with one of said elements and the electrical impedance of said element being sufficiently greater than the total impedance of the capacitors in series therewith that only a relatively small magnitude of reactive volt amperes is normally supplied by the capacitors of said one branch to said power system, and means for varying the reactive volt amperes supplied by said capacitors of each said one branch between said small magnitude and a relatively larger magnitude including a plurality of electrical short circuiting switches, each being connected in parallel with one of said elements and adapted upon closure to short circuit said one of said elements and upon opening to remove the short circuit, and means in each step after the first for operating all the electrical switches thereof substantially simultaneously.

8. In combination with a polyphase alternating current electrical power system, a star connected capacitor bank having a plurality of branches all of which are joined to define a neutral and each of which includes a plurality of serially connected capacitors, means for connecting a plurality of said branches in parallel to each of the phase conductors of said system, at least one of said branches connected to each phase conductor including an impedance element connected to the neutral of said star connected bank and in electrical series with the capacitors of said one of said branches, the capacitors of said one branch being normally energized in series with said element and the impedance of said element being sufficiently greater than the total impedance of the capacitors in series therewith that normally only a relatively small magnitude of reactive volt amperes is supplied by the capacitors of said one branch to said power system, and means for varying the reactive volt amperes supplied by the capacitors of said one branch to said system between said relatively small magnitude and a relatively larger magnitude including an individual electrical short circuiting switch connected in parallel with each said element adapted upon the receipt of electrical control signals to alternately close and short circuit said element and open and remove the short circuit, and means to supply control signals to all of said short circuiting switches substantially simultaneously.

9. In combination with an alternating current electrical power system, a capacitor bank having a plurality of branches each including a plurality of serially connected capacitors, means for connecting said branches in shunt to said power system, at least one of said branches including an impedance element having a metallic casing and being connected in series with the capacitors thereof, the capacitors of said one branch being normally energized in series with said element and the electrical impedance of said element being sufficiently greater than the total impedance of the capacitors in series therewith that only a relatively small magnitude of reactive volt amperes is normally supplied by the capacitors of said one branch to said power system, means for varying the reactive volt amperes supplied by said capacitors of said one branch to said power system between said small magnitude and a relatively larger magnitude including an electrical short circuiting switch having a metallic casing and being connected in parallel with said impedance element and adapted upon receipt of electrical control signals to alternately close and short circuit said impedance element and open and remove the short circuit, and means including a metal encased isolating transformer for supplying electrical control signals to said electrical switch, the casings of said impedance element, said switch, and said transformer being electrically commoned, and means for isolating said electrically commoned casings from ground.

10. In combination with a multi-step capacitor bank having a plurality of parallel branches each including a plurality of serially arranged capacitors connected in shunt to an alternating current power line, a plurality of metal-encased impedance elements connected in one of said branches in series with the capacitors thereof, a plurality of metal-encased electrical switches each being connected in parallel with one of said impedance elements and adapted upon closure to short circuit said one of said impedance elements and upon opening to remove the short circuit, the capacitors of said one branch being normally energized in series with said elements and normally supplying a relatively small magnitude of reactive volt amperes to said power line and being adapted upon closure of said switches to supply a greater magnitude of reactive volt amperes to said power line, said impedance elements and said switches being insulated to safely withstand a maximum voltage which is less than the voltage of said power line, and means for insulating the metal casings of said impedance elements and said switches from ground.

11. In combination with a multi-step capacitor bank having a plurality of parallel branches each including a plurality of serially arranged capacitors connected in shunt to an alternating current power line, a plurality of metal-encased impedance elements connected in one of said branches in series with the capacitors thereof, a plurality of metal-encased electrical switches adapted upon the receipt of electrical control signals to operate between open and closed positions, each said switch being connected in parallel with one of said impedance elements, the capacitors of said one branch being normally energized in series with said elements and normally supplying a relatively small magnitude of reactive volt amperes to said power line and being adapted upon closure of said switches to supply a greater magnitude of reactive volt amperes to said power line, means including a metal-encased isolating transformer for supplying electrical control signals simultaneously to all of said electrical switches, the voltage of said power line being greater than the maximum voltages which said impedance elements, said switches, and said transformer are insulated to safely withstand, and means for insulating the metal casings of said impedance elements, said switches, and said transformer from ground.

12. In combination with a polyphase alternating current electrical power system, a capacitor bank comprising a plurality of phase groups each of which includes capacitors adapted to be connected to one of the line conductors of said power system and in shunt to said system, each phase group having a plurality of parallel branches each of which includes a plurality of serially connected capacitors, means for connecting all of the parallel branches of all of the phase groups to the corresponding line conductors and in shunt to said system, at least one branch in each phase group including an impedance having a metal casing and being connected in electrical series with the capacitors of said branch and an electrical switch having a metal casing and being connected in parallel with said impedance and adapted upon the receipt of a first electrical control signal to close and short circuit said impedance and upon receipt of a second electrical control signal to open and remove the short circuit, and means for supplying electrical control signals to the electrical switches of all of the phase groups substantially simultaneously, said last named means including an individual metal encased isolating transformer in each phase group associated with said one branch of said phase group, the metal casings of said impedance, said electrical switch, and said transformer of each phase group being electrically commoned, and means in each phase group for insulating said electrically commoned casings from ground.

13. In combination with an alternating current electrical power system, a capacitor, an impedance element in series with said capacitor, the serial arrangement of said capacitor and said element normally being connected in shunt to said alternating current power system, said capacitor being normally energized in series with said element and the electrical impedance of said element being sufficiently greater than that of said capacitor that only a relatively small magnitude of leading current is normally supplied by said capacitor to said power system, and means for varying the leading current supplied by said capacitor to said power system between said small magnitude and a relatively larger magnitude including an electrical switch having a pair of normally open contacts connected in parallel with said element operable between open and closed positions and adapted upon closure to short circuit said element and upon opening to remove the short circuit at a voltage lower than that of said power system, and operating means for said electrical switch responsive to a source of energy independent of the voltage across said capacitor.

14. In combination with an alternating current electrical power system, a capacitor bank having a plurality of parallel branches each of which includes a plurality of serially connected capacitors, at least one of said branches including an impedance element in series with the capacitors thereof, the serial arrangement of said capacitors and said element normally being connected to said power system and said capacitors normally supplying reactive volt amperes to said system and the electrical impedance of said element being sufficiently greater than the total electrical impedance of said capacitors in series therewith that only a relatively small magnitude of reactive volt amperes is normally supplied by said capacitors of said one branch to said power system, and means for varying the reactive volt amperes supplied by said capacitors of said one branch between said small magnitude and a relatively larger magnitude including an electrical switch having a pair of normally open contacts in parallel with said element operable between open and closed positions and adapted upon closure to short circuit said element and upon opening to remove the short circuit.

15. In combination, an alternating current electrical power system, a capacitor bank adapted to supply reactive volt amperes to said systems in at least two steps the first of which includes a plurality of serially connected capacitors and the second of which includes the serial arrangement of an electrical impedance element and a plurality of serially connected capacitors, switching means for simultaneously connecting the serially connected capacitors of the first step in shunt to the power system and the serial arrangement of said element and the capacitors of said second step in shunt to said power system, the capacitors of said second step being normally energized in series with said element after operation of said switching means and the electrical impedance of said element being sufficiently greater than the total impedance of said capacitors in series therewith that only a relatively small magnitude of leading current is normally supplied by said capacitors of said second step to said system, means including an electrical switch having a pair of normally open contacts connected in parallel to said element operable between open and closed positions and adapted upon closure to short circuit said element and upon opening to remove the short circuit for varying the leading current supplied by said capacitors of said second step between said small magnitude and a relatively larger magnitude, and operating means for said electrical switch responsive to a source of energy independent of the voltage across the capacitors of said second step.

16. In combination with an alternating current electrical power system, a capacitor, an impedance element in series with said capacitor, the serial arrangement of said capacitor and said element normally being connected in shunt to said alternating current power system, said capacitor being normally energized in series with said element and the electrical impedance of said element being sufficiently greater than that of said capacitor that only a relatively small magnitude of reactive volt amperes is normally supplied by said capacitor to said power system, and means for varying the reactive volt amperes supplied by said capacitor to said power system between said small magnitude and a relatively larger magnitude including an electrical switch having a pair of normally open contacts connected in parallel with said element operable between open and closed positions and adapted upon closure to short circuit said element and upon opening to remove the short circuit at a voltage less than that of said power system.

References Cited in the file of this patent
UNITED STATES PATENTS 1,939,064    Kopczynski _____ Dec. 12, 1933